Patented Feb. 25, 1936

2,032,220

UNITED STATES PATENT OFFICE 2,032,220

MANUFACTURE OF GOLF BALLS AND THE LIKE

Edward Arthur Murphy and Douglas Frank Twiss, Erdington, Birmingham, and Robert Gilbert James, Selly Oak, Birmingham, England, assignors to Dunlop Rubber Company Limited, London, England, a British company No Drawing. Continuation of application Serial No. 543,014, June 8, 1931. This application December 27, 1934, Serial No. 759,338. In Great Britain July 29, 1930

1 Claim. (Cl. 18—50)

Our present invention relates to a method of forming golf ball covers from cover compositions and is a continuation of our application Serial No. 543,014 filed June 8, 1931.

Cover compositions or golf ball covers generally consist essentially or very largely of gutta, thermoplastic hydrocarbon, which forms the most important constituent of gutta-percha and of balata or "Surinam" gutta-percha. This material, being thermoplastic, softens when heated so that it may be molded and may take sharp impressions which it retains when cold. The temperature at which the composition softens is rather low, being about 150° F. (65–66° C.), so that it may be molded about the tense rubber windings of which the body or core of the golf ball is made without injuring or impairing the latter. When the molded cover is cold, however, it is extremely tough and resistant to cutting and holds its shape and its molded impressions or designs under the exacting conditions imposed upon it in use.

A method heretofore commonly used to form the cover composition and mold it in place was to masticate the gutta material, generally a purified gutta-percha or balata, with compounding ingredients and sometimes a small proportion of caoutchouc rubber, on mixing rolls and then to roll the composition or spread it into sheets from which small areas were cut and milled to form hemispherical shells. A pair of such shells were then assembled about the golf ball or body and molded into a complete cover in heated molds. The continued mastication of the composition, however, impairs or weakens its properties and it has therefore been proposed to form the composition by the use of solvents, thereby avoiding mastication, but this has the disadvantage that the removal of the solvent is difficult and the trace of solvent remaining in the composition weakens the latter.

Because of properties peculiar to gutta material, molding a powdered or finely divided cover composition, as may be done with some plastics, has not heretofore been applicable to cover compositions. Not all powders or finely divided materials can be formed into a tough, coherent golf ball cover at temperatures sufficiently low to avoid injury to the tightly wound rubber thread windings of the body of the ball. Owing to the peculiar tenacious character of gutta-percha, it resists disintegration, by the usual methods heretofore available, into a powder or into a finely divided state suitable for molding.

Our present invention, however, provides a method whereby cover compositions comprising gutta materials can be formed into a finely divided powder or crumb condition from which the cover may be molded.

In our invention a finely divided powder or crumb of cover composition is formed by mechanically disintegrating the cover material and then compressing and molding it with heat and pressure. To enable the gutta-percha or gutta material to be disintegrated, it is first subjected to a stretching treatment, for example, by passing between cold rolls or by extrusion under tension. Its extensibility is thereby much reduced and a longitudinally extending grain is developed which enables the material to be disintegrated mechanically by a disintegrator which snaps or snatches apart pieces, thereby pulverizing or sub-dividing it. This stretching of the material to reduce its extensibility enables the breaking up of material which would otherwise have resisted the disintegrating treatment. A gutta-percha powder or crumb is thus obtained without the milling or mastication and calendering treatment and consequent impairment of physical properties by which gutta-percha material has heretofore been commonly reduced to sheet form preparatory to forming an outer shell of a golf ball.

The disintegrated powder or crumb is then molded by heating and compressing to the desired shape. It can first be made into hemispherical halves by heating and pressing into suitable shaped molds and then the pair of complementary halves may be joined and held about the body or core of the ball under heat and pressure, or a golf ball body or core may be covered with a layer of the dry powder which is then molded directly to a continuous, compact cover in suitable heated molds.

Gutta material may be compounded with suitable compounding material such as rubber, resins, mineral rubber, rubber waste, oils, casein, etc. It may be compounded with sulphur, vulcanization accelerators, coloring materials or preservatives.

Where coarse fibrous powder is desired the gutta-percha is subjected to the action of a rotating emery wheel or file. It is preferable to collect the particles in cold water containing a wetting agent such as soap. The gutta material may also be coarsely disintegrated by extruding it in the form of fine threads into cold water and submitting the fibrous mass to a tearing and disintegrating action. The crumb-like or powder-like material is then introduced into molds, heated to temperatures of 90° to 100° C., and subjected to a pressure of 1000 pounds per square inch for fifteen minutes, whereupon it will have united into a compact coherent cover. Golf ball centers previously wound with rubber threads are then provided with the outer shells so obtained and then placed in an engraved mold where they are subjected to a second molding in order to impart to the surfaces of the cups the desired pattern and to weld them together.

In our above invention we have, therefore, provided a powder of gutta composition that may be molded by heat and pressure into a golf ball cover. The cover formed from the powder thus obtained is compact and tenacious and has all of the properties desirable in a golf ball cover but avoids the disadvantages of milling or mastication and of the use of solvents.

What we claim is—

A method of forming gutta containing powders moldable under heat and pressure to form a golf ball cover which comprises reducing the extensibility of a gutta composition by stretching it or extending it while cold, and then sub-dividing it into fine particles.

EDWARD ARTHUR MURPHY.
DOUGLAS FRANK TWISS.
ROBERT GILBERT JAMES.